Oct. 9, 1951          H. F. VICKERS          2,570,411
POWER TRANSMISSION

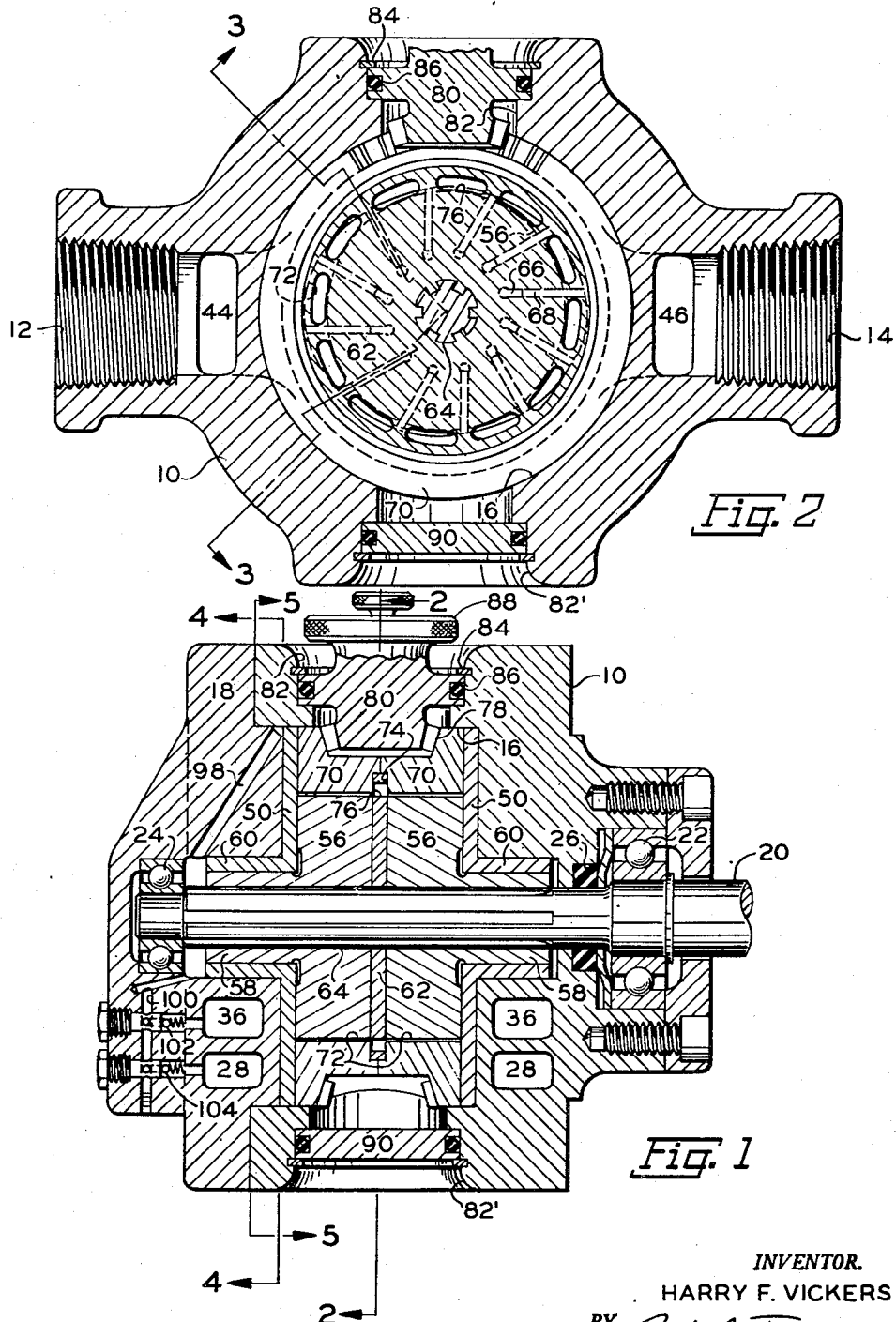

Filed Sept. 5, 1946                              3 Sheets–Sheet 2

*INVENTOR.*
HARRY F. VICKERS
BY
*ATTORNEY*

Oct. 9, 1951  H. F. VICKERS  2,570,411
POWER TRANSMISSION
Filed Sept. 5, 1946  3 Sheets-Sheet 3

INVENTOR.
HARRY F. VICKERS
BY  Ralph R. Tweedale
ATTORNEY

Patented Oct. 9, 1951

2,570,411

UNITED STATES PATENT OFFICE 2,570,411

POWER TRANSMISSION

Harry F. Vickers, Detroit, Mich., assignor to Vickers Incorporated, Detroit, Mich., a corporation of Michigan Application September 5, 1946, Serial No. 694,917

14 Claims. (Cl. 103—3)

1

This invention relates to power transmissions, particularly to those of the type comprising two or more fluid pressure energy translating devices, one of which may function as a pump and another as a fluid motor.

The invention is more particularly concerned with a vane pump of the reversible, variable displacement type.

In the patent to Vickers No. 1,989,900 there is disclosed a vane pump construction of the fixed displacement type which has found wide use in the power transmission field. Pumps of this character provide reliable operation and long life under the high pressure and heavy duty service conditions encountered in hydraulic transmission systems at a very economical cost. They have, however, heretofore been available only as fixed displacement pumps and thus require auxiliary flow regulating valves where the output speeds of the transmission system are to be varied.

It is an object of the present invention to provide an improved vane pump construction in which the output of the pump may be smoothly varied between zero and full capacity and in either direction of flow without reversing the rotation of the pump shaft.

A further object is to provide a pump of this character of rugged reliable construction and which may be economically produced.

Further objects and advantages of the present invention will be apparent from the following description, reference being had to the accompanying drawings wherein a preferred form of the present invention is clearly shown.

In the drawings:

Figure 1 is a longitudinal cross section of a vane pump embodying a preferred form of the present invention being taken on line 1—1 of Figure 2.

Figure 2 is a transverse cross section on line 2—2 of Figure 1.

Figure 4:
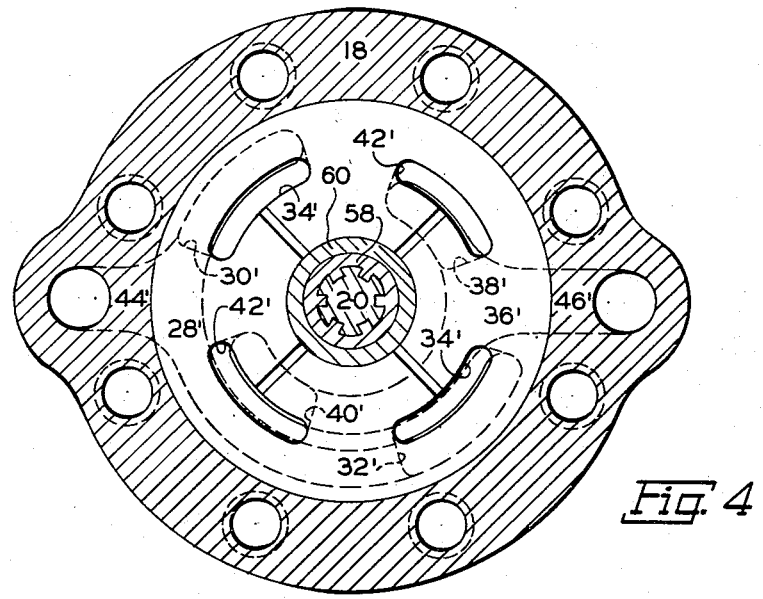
Figure 4 is a transverse cross section on line 4—4 of Figure 1 with the pump cartridge removed.

Referring now to the drawings, there is disclosed a pump casing 10 having inlet and outlet ports 12 and 14. The casing 10 is provided with a generally cylindrical chamber 16 for the reception of a pumping element cartridge and an end

Figure 5:
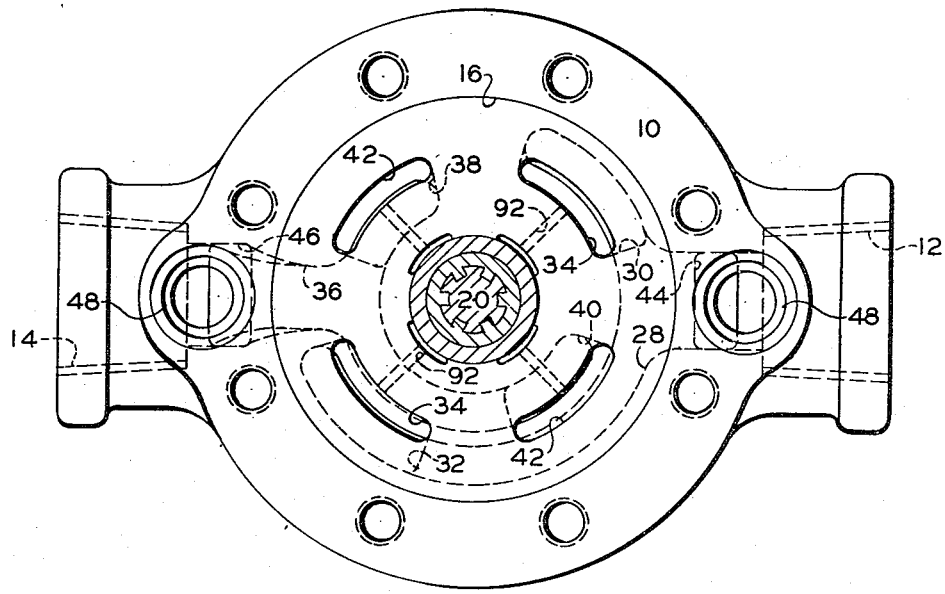
Figure 5 is a section on line 5—5 of Figure 1.

2 head 18 is adapted to be bolted to the casing 10 to close the chamber 16. A pump shaft 20 is mounted on ball bearings 22 and 24 in the casing and head, respectively, and has a suitable oil seal 26. The casing 10 is provided with an arcuate cored passage 28 (see Figure 5) which communicates with port 12 and has converging extensions 30 and 32 opening into the end wall of the chamber 16 by arcuate ports 34 which are diametrically spaced with respect to each other. The casing 10 is also provided with an arcuate core 36 connecting with the port 14 and opening by extensions 38 and 40 into a pair of ports 42 also diametrically located in the end wall of the chamber 16. The head 18 is provided with similar cored passageways and ports carrying the same reference characters primed. The main cores 28 and 28' are connected by branch cores 44 and 44' while the main cores 36 and 36' are connected by branch cores 46 and 46'. These cores are positioned to register with each other at the joint between the casing 10 and the head 18 where they may be provided with suitable sealing means such as the synthetic rubber sealing rings 48. Thus all of the four ports 34 and 34' are connected with the pump connection port 12 and all of the four ports 42 and 42' are connected with the pump connection port 14.

Figures 6, 7:
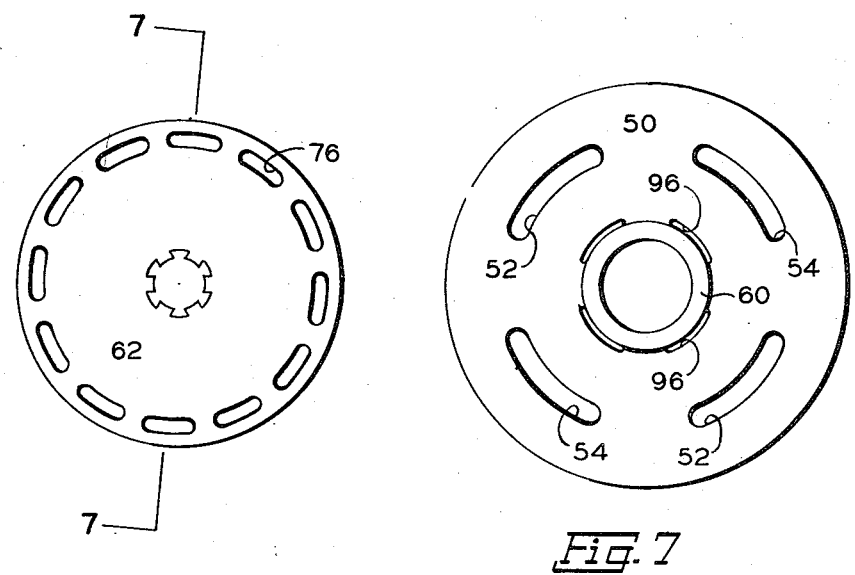
Figure 6 is a side view of a separator element.
Figure 7 is a side view of a bushing element.

Mounted in the cylindrical cavity 16 is a pump cartridge which comprises a pair of duplicate flanged bushings 50. Each bushing 50 is provided with four arcuate ports 52 and 54 which are coextensive with and register with the ports 34 and 42 in the casing 10 and their corresponding ports in the head 18. The pump rotor preferably consists of three parts including two identical main rotor elements 56 having trunnions 58 which are journaled in the tubular bearing portions 60 of the bushings 50. The third part comprises a separator disc 62 (see Figure 6). The three rotor parts are provided with splined openings at their center which are fitted somewhat loosely on the splined portion 64 of the shaft 20. The rotor elements 56 are provided with a plurality of slots or recesses 66, each of which carries two radially slidable vanes 68, one on each side of the separator disc 62.

Rotatably mounted in the recess 16 are a pair of duplicate liner rings 70. The rings 70 have the usual oval cylindrical inner surface 72 and are provided with a recess 74 to receive the separator disc 62. The latter is provided with a plurality of elongated holes 76 in register with the space between adjacent vanes. The liner rings 70 are provided with beveled geared teeth 78 which cooperate with a beveled pinion 80 rotatably mounted in a bore 82 in the casing 10. A snap ring 84 and O-ring seal 86 serve to position the pinion in place and maintain an oil tight seal. The pinion 80 may be provided with a suitable knurled knob 88 for the purpose of turning the same manually. A duplicate bore 82' may be provided opposite the bore 82 and closed with a dummy plug 90 to provide an alternate mounting for the pinion 80.

Figure 3:
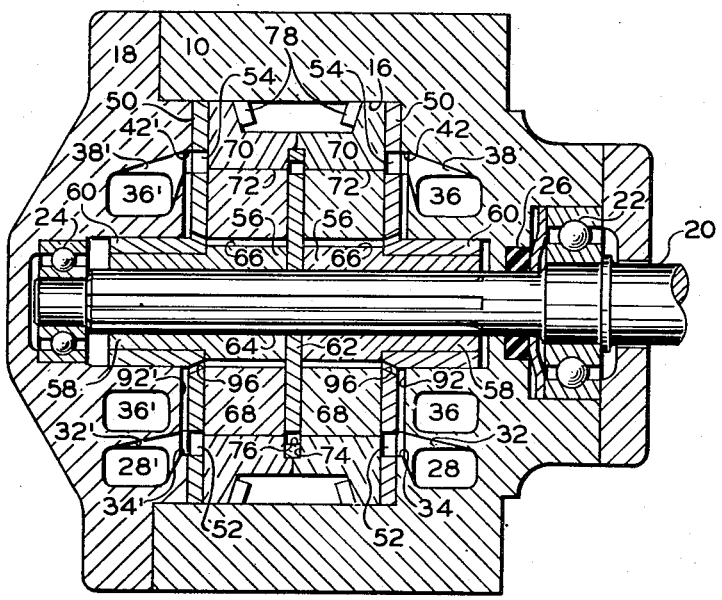
Figure 3 is a longitudinal section on line 3—3 of Figure 2.

For the purpose of connecting the inner ends of the vane slots 66 for pressure actuation of the vanes outwardly, the end walls of recess 16 are provided with radial slots 92 extending inwardly from each of the ports. These slots register as shown in Figure 3 with arcuate ports 96 which are opposite the inner ends of the vane slots 66. There are four ports 96 provided in each bushing 50 and they may preferably be of somewhat greater arcuate extent than the corresponding ports 52 and 54. The head 18 may be provided with a suitable seepage drain passage 98 connecting the outer corner of the chamber 16 with the central chamber containing bearing 24. This chamber in turn may be connected by a passage 100 to the cores 36' and 28' by suitable check valves 102 and 104.

The operation of the pump will be evident by considering the same connected into a suitable power transmission circuit which is filled with oil and with the shaft 20 driven by a suitable prime mover in the clockwise direction in Figure 2 it will be seen that as the rotors 56 revolve, the vanes 68 will sweep around the oval track of the liners 70. The working chambers formed by the rotor, the vanes, the rings and the side bushings will be expanding in size as they pass the ports 52 and will be contracting in size as they pass the ports 54. This is true with the two liner rings 70 in registering position as shown in the drawings. Under these conditions fluid will be drawn in through connection 12, its connected cores, and ports 52 to each working chamber between adjacent vanes of each rotor as they pass the ports 52. Each working chamber is thus filled with oil and as it passes across the horizontal center line will approach the ports 54 and begin to contract delivering its charge of oil into those ports. The operation of these conditions is analogous to that of the vane pump described in the Vickers patent.

The variable displacement and reversibility features of the present pump are based upon the principle that the sum of two sine curves which are in phase with each other is another sine curve in the same phase and that if the two sine curves be displaced equally and oppositely from their original phase by any amount, the sum of the two is a smaller sine curve, the phase relationship of which does not shift and the amplitude of which decreases as the two curves are more displaced. When the two sine curves have been displaced each 90 degrees from original position or 180 degrees apart, the sum of the two is zero and when displaced further, the sum is a sine curve of opposite sign but remaining in the original phase position. It is preferred to construct the pump so that the volume of each working chamber between adjacent vanes changes as a function of angular position in the pump which closely approaches a sine curve. For this purpose, the oval contour of the liners 70 may be a true ellipse. The design does not, however, require such curvature and other oval forms may be used as desired. The true ellipse does, however, provide the smoothest and least pulsating delivery rate from the pump.

If it is desired to reduce the delivery rate, the pinion 80 may be rotated which will rotate the two rings 70 equally and in opposite directions to any extent desired. This has the effect in each half of the pump of shifting the four points of maximum expansion and maximum contraction of the working chambers (which, for convenience, will hereafter be termed dead center positions) out of phase with the cross over points in the valving between the edges of ports 52 and 54. Thus, whereas formerly the dead center positions of the liner rings were intermediate the cross over points in the valving they now become shifted. Each pair of working chambers, one on either side of the separator 62, constitutes in effect a single working chamber since the two are always connected through an aperture 76. Thus, their effective volume change is equal to the sum of their individual volume changes.

In accordance with the above mentioned sine law, the volume of each dual working chamber associated with each aperture 76 will thus vary in accordance with a sine curve, the phase position of which remains fixed. Thus, the point of minimum volume of each dual chamber and the point of maximum volume remains at the dead center positions originally described. The amplitude of the sine curve will, however, decrease progressively as the displacement of the two liner rings 70 from their original position is increased until, when they are 180 degrees apart, the amplitude will be zero. Upon further displacement of the liner rings in the same direction, the sign of the sine curve becomes opposite and its amplitude increases as the displacement of the rings is further increased. Under these conditions, each dual working chamber will have a net expansion of volume as it passes the ports 54 and a net contraction of volume as it passes the ports 52. Thus the delivery of the pump will be reversed and oil will be drawn in through connection 14 and delivered out through connection 12.

From the preceding explanation of the volume changes which take place in any one dual working chamber, it will be evident that the sum of all of the working chamber displacements will provide a rate of delivery which is substantially constant. The fact that the inner end of the vane slots 66 communicate with ports 96 alternately in their rotation assures that the small volume contained in the vane slots as the vanes move inwardly and outwardly is added to the delivery taking place through the main ports and this serves to exactly compensate the volume represented by the tips of the vanes in the space between rotor and liner ring. Thus the delivery rate of the pump is substantially constant in the sense that it is nonpulsating at all adjusted positions of the liner rings 70.

It will be noted that the pump remains in radial balance at all settings due to the fact that there are always two groups of working chambers diametrically opposed from each other and of equal arcuate extent which are under operating pressure. Thus the radial load on the rotor represented by this pressure is balanced out exactly. In addition, the torque loads on the liner rings 70 are balanced out by the pinion 80. This torque load tends to rotate both rings in the same direction as the rotor is revolving and the pinion 80 carries this load to the casing 10. It is thus possible to displace the rings 70 by rotation of pinion 80 without having to overcome any loads other than inherent friction in the mechanism and there is no tendency of the pump to change its displacement setting due to build up in operating pressure. Any leakage from the working chambers which finds its way along the clearances between the rotor and bushings and rings will be collected in the passages 98 and 100 and will be returned to whichever one of the main cores 36' and 28' has the lowest pressure at any moment. Since under normal conditions the low pressure core is the pump inlet, the seepage fluid is thus returned to the inlet of the pump without escaping from the system as a whole.

While the form of embodiment of the invention as herein disclosed constitutes a preferred form, it is to be understood that other forms might be adopted, all coming within the scope of the claims which follow.

What is claimed is as follows:

1. A vane pump comprising a casing having inlet and outlet connections and forming a pumping chamber, a rotor in said chamber having two side-by-side sets of circumferentially distributed vane receiving recesses, a vane in each recess, a pair of oval shaped liner rings rotatably mounted side by side in the chamber and surrounding the rotor, means providing a pair of diametrically positioned inlet ports and a pair of diametrically positioned outlet ports, both pairs of ports being fixed with respect to the casing and opening into the working spaces between the rotor and rings, and means connecting said liner rings for conjoint rotary adjustment relative to the inlet and outlet ports in opposite directions from a first position in which their oval contours are in register for pumping full capacity in one direction to a second position in which the oval contours are again in register but transposed to each other for pumping full capacity in the opposite direction.

2. A vane pump comprising a casing having inlet and outlet connections and forming a pumping chamber, a rotor in said chamber having two side-by-side sets of circumferentially distributed vane receiving recesses, a vane in each recess, a pair of oval shaped liner rings rotatably mounted side by side in the chamber and surrounding the rotor, means providing a pair of diametrically positioned inlet ports and a pair of diametrically positioned outlet ports, both pairs of ports being fixed with respect to the casing and opening into the working spaces between the rotor and rings, and means connecting said liner rings for conjoint rotary adjustment relative to the inlet and outlet ports in opposite directions from a first position in which their oval contours are in register for pumping full capacity in one direction to a second position in which the oval contours are again in register but transposed to each other for pumping full capacity in the opposite direction, each pair of side-by-side working spaces ahead of side-by-side vanes being in permanent communication with each other whereby the delivery of the pump may be smoothly varied in a stepless manner over the full range of pump delivery in either direction.

3. A vane pump comprising a casing having inlet and outlet connections and forming a pumping chamber, a rotor in said chamber having two side-by-side sets of circumferentially distributed vane receiving recesses, a vane in each recess, a pair of oval shaped liner rings rotatably mounted side by side in the chamber and surrounding the rotor, means providing a pair of diametrically positioned inlet ports and a pair of diametrically positioned outlet ports, both pairs of ports being fixed with respect to the casing and opening into the working spaces between the rotor and rings, and means connecting said liner rings for conjoint rotary adjustment relative to the inlet and outlet ports in opposite directions, each pair of side-by-side working spaces ahead of side-by-side vanes being in permanent communication with each other whereby the delivery of the pump may be smoothly varied in a stepless manner over the full range of pump delivery in either direction.

4. A vane pump comprising a casing having inlet and outlet connections and forming a pumping chamber, a rotor in said chamber having two side-by-side sets of circumferentially distributed vane receiving recesses, a vane in each recess, means forming a separator between said vanes extending radially beyond the rotor, a pair of oval shaped liner rings rotatably mounted side by side in the chamber and surrounding the rotor, means providing a pair of diametrically positioned inlet ports and a pair of diametrically positioned outlet ports, both pairs of ports being fixed with respect to the casing and opening into the working spaces between the rotor and rings, and means connecting said liner rings for conjoint rotary adjustment relative to the inlet and outlet ports in opposite directions, each pair of side-by-side working spaces ahead of side-by-side vanes being in permanent communication with each other whereby the delivery of the pump may be smoothly varied in a stepless manner over the full range of pump delivery in either direction.

5. A vane pump comprising a casing having inlet and outlet connections and forming a pumping chamber, a rotor in said chamber having two side-by-side sets of circumferentially distributed vane receiving recesses, a vane in each recess, means forming a separator between said vanes extending radially beyond the rotor, a pair of oval shaped liner rings rotatably mounted side by side in the chamber and surrounding the rotor, means providing a pair of diametrically positioned inlet ports and a pair of diametrically positioned outlet ports, both pairs of ports being fixed with respect to the casing and opening into the working spaces between the rotor and rings, and means connecting said liner rings for conjoint rotary adjustment relative to the inlet and outlet ports in opposite directions, said separator having apertures connecting together each pair of working spaces which lie in front of the pair of vanes in a recess whereby the delivery of the pump may be smoothly varied in a stepless manner over the full range of pump delivery in either direction.

6. A vane pump comprising a casing having inlet and outlet connections and forming a pumping chamber having a generally cylindrical shape with flat walls at either end, a rotor in said chamber having two side-by-side sets of circumferentially distributed vane receiving recesses, a vane in each recess, a pair of oval shaped liner rings rotatably mounted side by side in the chamber and surrounding the rotor, means forming two pairs of diametrically opposite inlet ports, one pair opening into one end wall of the pumping chamber and the other pair opening into the other end wall, means forming two pairs of diametrically opposite outlet ports, one pair opening into one end wall of the pumping chamber and the other pair opening into the other end wall, passages connecting all of said inlet ports with the inlet connections and all of said outlet ports with the outlet connections, and means connecting said liner rings for conjoint rotary adjustment relative to the inlet and outlet ports in opposite directions from a first position in which their oval contours are in register for pumping full capacity in one direction to a second position in which the oval contours are again in register but transposed to each other for pumping full capacity in the opposite direction.

7. A vane pump comprising a casing having inlet and outlet connections and forming a pumping chamber having a generally cylindrical shape with flat walls at either end, a rotor in said chamber having two side-by-side sets of circumferentially distributed vane receiving recesses, a vane in each recess, a pair of oval shaped liner rings rotatably mounted side by side in the chamber and surrounding the rotor, means forming two pairs of diametrically opposite inlet ports, one pair opening into one end wall of the pumping chamber and the other pair opening into the other end wall, means forming two pairs of diametrically opposite outlet ports, one pair opening into one end wall of the pumping chamber and the other pair opening into the other end wall, passages connecting all of said inlet ports with the inlet connections and all of said outlet ports with the outlet connections, and means connecting said liner rings for conjoint rotary adjustment relative to the inlet and outlet ports in opposite directions, each pair of side-by-side working spaces ahead of side-by-side vanes being in permanent communication with each other whereby the delivery of the pump may be smoothly varied in a stepless manner over the full range of pump delivery in either direction.

8. A vane pump comprising a casing having inlet and outlet connections and forming a pumping chamber having a generally cylindrical shape with flat walls at either end, a rotor in said chamber having two side-by-side sets of circumferentially distributed vane receiving recesses, a vane in each recess, a pair of oval shaped liner rings rotatably mounted side by side in the chamber and surrounding the rotor, means forming two pairs of diametrically opposite inlet ports, one pair opening into one end wall of the pumping chamber and the other pair opening into the other end wall, means forming two pairs of diametrically opposite outlet ports, one pair opening into one end wall of the pumping chamber and the other pair opening into the other end wall, passages connecting all of said inlet ports with the inlet connections and all of said outlet ports with the outlet connections, and means connecting said liner rings for conjoint rotary adjustment relative to the inlet and outlet ports in opposite directions, each pair of side-by-side working spaces ahead of side-by-side vanes being in permanent communication with each other whereby the delivery of the pump may be smoothly varied in a stepless manner over the full range of pump delivery in either direction, said casing having a main part carrying the inlet and outlet connections and providing one end wall of the pumping chamber and another part providing the other end wall of the pumping chamber and a pair of conduits extending through both parts and connecting the inlet and outlet ports in one part with those in the other part.

9. A vane pump comprising a casing having inlet and outlet connections and forming a pumping chamber having a generally cylindrical shape with flat walls at either end, a rotor in said chamber having two side-by-side sets of circumferentially distributed vane receiving recesses, a vane in each recess, a pair of oval shaped liner rings rotatably mounted side by side in the chamber and surrounding the rotor, means forming two pairs of diametrically opposite inlet ports, one pair opening into one end wall of the pumping chamber and the other pair opening into the other end wall, means forming two pairs of diametrically opposite outlet ports, one pair opening into one end wall of the pumping chamber and the other pair opening into the other end wall, passages connecting all of said inlet ports with the inlet connections and all of said outlet ports with the outlet connections, and means connecting said liner rings for conjoint rotary adjustment relative to the inlet and outlet ports in opposite directions, each pair of side-by-side working spaces ahead of side-by-side vanes being in permanent communication with each other whereby the delivery of the pump may be smoothly varied in a stepless manner over the full range of pump delivery in either direction, said casing having a main part carrying the inlet and outlet connections and providing one end wall of the pumping chamber and another part providing the other end wall of the pumping chamber and a pair of conduits extending through both parts and connecting the inlet and outlet ports in one part with those in the other part, said conduits extending parallel to the rotor axis and spaced therefrom beyond the periphery of the pumping chamber.

10. A variable displacement pump of the rotary vane type comprising a pair of vane pumps, each providing a plurality of expansible working chambers, means forming a rotary actuating member common to both pumps associated with the chambers, a pair of normally stationary reaction members cooperating with the actuating member to cause a fixed amount of cyclic expansion and contraction of the working chambers, distributing valve ports connectable and disconnectable with each working chamber in timed relation with the actuating member to control the inlet and outlet of fluid to and from each chamber, and means for varying the phase relationship between the valve connecting and disconnecting operation and the chamber expansion and contraction of each pump simultaneously but oppositely, each working chamber of one pump being in permanent communication with a working chamber of the other pump whereby the net displacement of both pumps may be adjusted to any degree over a predetermined range.

11. A variable displacement pump of the rotary vane type comprising a pair of vane pumps, each providing a plurality of expansible working chambers, means to cause a fixed amount of cyclic expansion and contraction of the working chambers, distributing valve ports connectable and disconnectable with each working chamber in timed relation with said means to control the inlet and outlet of fluid to and from each chamber, and means for varying the phase relationship between the valve connecting and disconnecting operation and the chamber expansion and contraction of each pump simultaneously but oppositely, each working chamber of one pump being in permanent communication with a working chamber of the other pump whereby the net displacement of both pumps may be adjusted to any degree over a predetermined range.

12. A variable displacement pump of the rotary vane type comprising a pair of vane pumps, each providing a plurality of expansible working chambers, means including a rotary member common to both pumps and a pair of individual normally stationary but adjustable members to cause a fixed amount of cyclic expansion and contraction of the working chambers, distributing valve ports connectable and disconnectable with each working chamber in timed relation with said means to control the inlet and outlet of fluid to and from each chamber, and means for varying the phase relationship between the valve connecting and disconnecting operation and the chamber expansion and contraction of each pump simultaneously but oppositely, each working chamber of one pump being in permanent communication with a working chamber of the other pump whereby the net displacement of both pumps may be adjusted to any degree over a predetermined range.

13. A variable displacement pump of the rotary vane type comprising a pair of vane pumps, each providing a plurality of expansible working chambers, means to cause a fixed amount of substantially sinusoidal cyclic expansion and contraction of the working chambers, distributing valve ports connectable and disconnectable with each working chamber in timed relation with said means to control the inlet and outlet of fluid to and from each chamber, and means for varying the phase relationship between the valve connecting and disconnecting operation and the chamber expansion and contraction of each pump simultaneously but oppositely, each working chamber of one pump being in permanent communication with a working chamber of the other pump to maintain a sinusoidal cyclic expansion and contraction of the total volume of each connected pair of working chambers which is of unvarying phase with respect to the valve connecting and disconnecting operation but of a variable amount depending on the variation of said phase relationship.

14. A variable displacement pump of the rotary vane type comprising a pair of vane pumps, each providing a plurality of expansible working chambers, means including a rotary member common to both pumps and a pair of individual normally stationary but adjustable members, one of said members being oval in contour to cause a fixed amount of cyclic expansion and contraction of the working chambers twice per revolution of the rotary member, distributing valve ports connectable and disconnectable with each working chamber in timed relation with said means to control the inlet and outlet of fluid to and from each chamber, and means for varying the phase relationship between the valve connecting and disconnecting operation and the chamber expansion and contraction of each pump simultaneously but oppositely, each working chamber of one pump being in permanent communication with a working chamber of the other pump whereby the net displacement of both pumps may be adjusted to any degree over a predetermined range.

HARRY F. VICKERS.

REFERENCES CITED

The following references are of record in the file of this patent:

UNITED STATES PATENTS

| Number | Name | Date |
|---|---|---|
| 711,662 | Herdman | Oct. 21, 1902 |
| 886,047 | Flinn | Apr. 28, 1908 |
| 1,989,900 | Vickers | Feb. 5, 1935 |
| 2,330,565 | Eckart | Sept. 28, 1943 |
| 2,401,567 | Jeannin | June 4, 1946 |
| 2,406,964 | Orr | Sept. 3, 1946 |
| 2,462,500 | Hoffer | Feb. 22, 1949 |
| 2,496,915 | Hoffer | Feb. 7, 1950 |

FOREIGN PATENTS

| Number | Country | Date |
|---|---|---|
| 415,425 | Germany | July 1922 |
| 608,794 | France | Aug. 2, 1926 |